United States Patent [19]
Ishida

[11] Patent Number: 4,716,882
[45] Date of Patent: Jan. 5, 1988

[54] SOLAR HEAT COLLECTOR
[75] Inventor: Masaharu Ishida, Shizuoka, Japan
[73] Assignee: Yazaki Corporation, Tokyo, Japan
[21] Appl. No.: 870,455
[22] Filed: Jun. 4, 1986

Related U.S. Application Data
[63] Continuation-in-part of Ser. No. 311,278, Oct. 14, 1981, abandoned.

[51] Int. Cl.$^4$ ................................................ F24J 2/04
[52] U.S. Cl. ..................................... 126/441; 126/411; 126/450
[58] Field of Search ............... 126/441, 417, 448, 450, 126/449

[56] References Cited

U.S. PATENT DOCUMENTS

| | | | |
|---|---|---|---|
| 4,019,496 | 4/1977 | Cummings | 126/441 |
| 4,078,544 | 3/1978 | Hollands et al. | 126/441 |
| 4,114,597 | 9/1978 | Erb | 126/450 |
| 4,294,231 | 10/1981 | Golay | 126/441 |
| 4,323,053 | 4/1982 | McCullogh et al. | 126/441 |

FOREIGN PATENT DOCUMENTS 0076875 4/1983 European Pat. Off. ............ 126/441

OTHER PUBLICATIONS
"An Independent Measurement of the Amorphous Content of Polymers", Journal of Polymer Science, vol. XIX, pp. 485–494, (12/1956).

Primary Examiner—Larry Jones
Attorney, Agent, or Firm—Koda and Androlia

[57] ABSTRACT

A solar heat collector, wherein an absorber plate is mounted in a box member provided on the upper surface thereof with a transparent sheet. The surface of the absorber plate is subjected to a selective absorption surface treatment, and a transparent heat trap is bent into continuous V-shapes and disposed between the transparent sheet and the absorber plate. The transparent heat trap is formed of an ethylene fluoride series resin film having a film thickness of 1 to 100 $\mu$m, having a degree of crystallinity of 35 to 55% and being transparent for the infrared rays as well as for the solar rays. With this arrangement, heat losses due to convection, radiation and conduction are suppressed at the same time, so that a high heat collecting efficiency can be secured.

4 Claims, 9 Drawing Figures

FIG. I
PRIOR ART
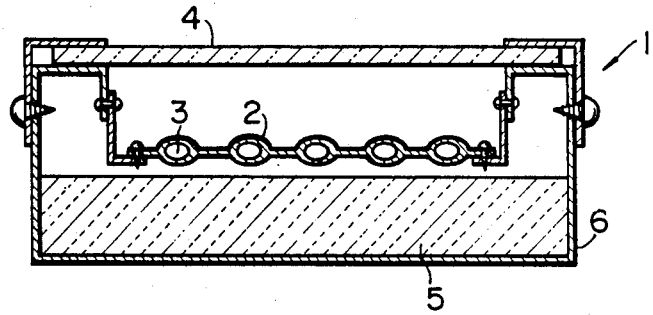
FIG.2(A)
PRIOR ART
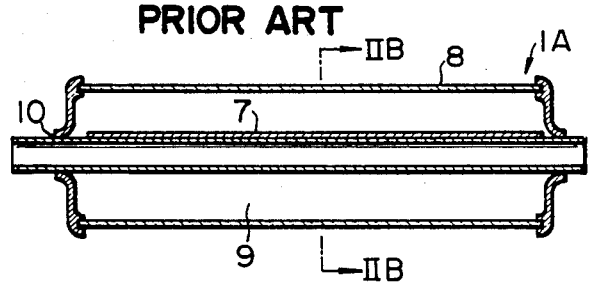
FIG.2(B)
PRIOR ART
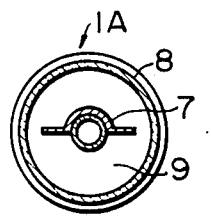
FIG.3
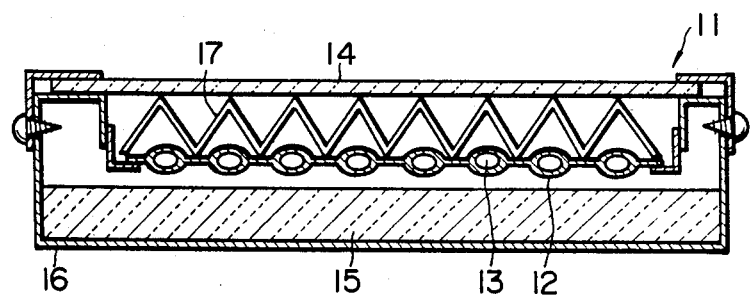

SOLAR HEAT COLLECTOR

This is a continuation-in-part of application Ser. No. 311,278, filed Oct. 14, 1981, now abandoned.

BACKGROUND OF THE INVENTION

1. Field of the Invention

This invention relates to a solar heat collector for a hot water supply, solar heat air conditioning systems and the like.

2. Description of the Prior Art

Heretofore, there have been proposed various types of solar heat collectors for the hot water supply, solar heat air conditioning systems and the like.

FIG. 1 is an explanatory view illustrating a solar heat collector 1 of the prior art. This solar heat collector 1 comprises: an absorber plate 2 for converting the solar rays into thermal energy to transmit the thermal energy to a heat transfer medium such as water; a heat transfer medium flow path 3 formed in the absorber plate 2; a transparent sheet 4 made of glass or the like for preventing the convection heat loss through the absorber plate 2 and protecting the absorber plate 2 against the contaminatipn and damages caused by the external factors; a heat insulating material 5 for preventing the heat loss through the rear surface of the solar heat collector; and an outer box 6 for protecting the abosrber plate 2 and the insulating material 5, totally covering the solar heat collector in cooperation with the transparent sheet 4.

The performance (i.e. efficiency) of the abovedescribed solar heat collector is determined by the extent of suppressing the heat loss: the heat loss would be caused in a manner that a part of the abosorbed energy which has been converted to the thermal energy from the solar rays at the absorber plate 2 of the solar heat collector is discharged through the transparent sheet 4 to the outside of the solar heat collector by the mechanisms of convection, radiation and conduction. As the methods of suppressing the heat loss described above, there have been proposed the following ones:

(1) The surface of the absorber plate 2 is subjected to a selective absorption surface treatment for suppressing the radiation heat loss. This treatment prevents the infrared rays from radiating from the absorber plate 2 toward the transparent sheet 4; the radition of the infrared rays is caused by the thermal energy to which the solar rays are converted at the absorber plate 2. Thus, this treatment suppresses the radiation heat loss from the absorber plate 2 toward the transparent sheet 4.

(2) A convection preventive structure such as a honeycomb transparent heat trap for suppressing the convection heat loss is provided between the absorber plate 2 and the transparent sheet 4. The convection heat loss is caused by the following mechanism: there occurs the temperature difference between the high-temperature absorber plate 2 and the low-temperature transparent sheet 4; a convection current is generated in the space between the absorber plate 2 and the transparent sheet 4; and the thermal energy of the absorber plate 2 is transferred to the transparent sheet 4 to cause heat loss. Such convection heat loss is suppressed by the provision of the convection preventive structure in the space between the absorber plate 2 and the transparent sheet 4. This method is disclosed in U.S. Pat. No. 4,019,496.

(3) There is utilized a vacuum heat insulating system for controlling the conductio heat loss and the convection heat loss.

Now, the abovedescribed conventional methods of suppressing the heat loss in the solar heat collectors have displayed effects in suppressing the heat losses to some extent, however, the three forms of heat losses due to the convection, radiation and conduction have such causal relations that, when one of these three losses is suppressed, the heat losses due to the remaining causes are accordingly increased, and, when two of these three heat losses are suppressed, the heat loss due to the remaining cause is accordingly increased.

For example, in the solar heat collector 1 shown in FIG. 1, when the surface of the absorber plate 2 is subjected to the selective absorption surface, the quantity of radiation heat from the absorber plate 2 to the transparent sheet 4 is decreased, however, with the result that the transparent sheet 4 is lowered in temperature, thus resulting in increased quantity of convectio heat from the absorber plate 2 to the transparent sheet 4. As the measures of preventing such increased quantity of convectio heat from the absorber plate to the transparent sheet, there has been proposed that a transparent (for the solar rays) heat trap having a thickness of 20 to 100 μm is provided between the transparent sheet and the absorber plate subjected to the selective abspotion surface treatment, as disclosed in U.S. Pat. No. 4,294,198. It is admitted that the convection between the abosorber plate and the transparent sheet is decreased with this measures. This measures, however, encounters the following problems: the above heat trap is transparent for the solar rays but not transparent for the infrared rays, i.e. a small extent of the infrared radiation is not expected; and thus the thermal energy transferred from the absorber plate to the heat trap by the convection will now radiates as the infrared rays from the heat trap toward the transparent sheet.

On the other hand, in the cae of the conventional vacuum cylindrical solar heat collector 1A shown in FIGS. 2(A) and 2(B), when the surface of the absorber plate 2 is formed into the selective absorptio surface and a gap 9 for heat insulating disposed between the absorber plate 7 and a transparent cover 8 is vacuum-insulated, the heat losses in two forms of the radiation and convection can be suppressed, however, the heat loss through a vacuum sealed potion 10 due to the conduction is increased to a great extent.

Consequently, as described in the two examples shown above, the conventional methods of suppressing the heat loss in the solar heat collectors display the effects to some extent, however, present such a disadvantage that the heat losses of the three forms cannot be suppressed at the same time.

SUMMARY OF THE INVENTION

The present invention has been developed to obviate the abovedescribed disadvantage of the prior art and has as its object the provision of a solar heat collector at a high thermal efficiency, wherein the heat losses of the three forms can be simultaneously suppressed without attenuating the incident solar enegry.

To achieve the abovedescribed object, according to the present invention, in a solar heat collector having an absorber plate in a box member provided at the surface thereof with a transparent sheet, the surface of the absorber plate is subjected to a selective absorption surface treatment (referred to as "factor A" hereinafter) and a V-shaped transmitting member ("factor D") formed of an ethylene fluoride series resin film ("factor C") between the transparent sheet and the absorber plate, which film has a film thickness of 1 to 100 μm, and has a degree of crystallinity of 35 to 55%, and is transparent for the infrared rays as well as for the solar rays ("factor B").

BRIEF DESCRIPTION OF THE DRAWINGS

The above mentioned features and objects of the present invention will become more apparently with reference to the following descriptio taken in conjunction with the accompanying drawings, wherein like reference numerals denote like elements and in which:

FIG. 1 is a sectional view showing the solar heat collector of the prior art;

FIG. 2(A) is a sectional view showing an example of the vacuum cylindrical solar heat collector of the prior art;

FIG. 2(B) is a sectional view taken along the line IIB—IIB in FIG. 2(B);

FIG. 3 is a sectional view showing an embodiment of the solar heat collector according to the present invention;

DESCRIPTION OF THE PREFERRED EMBODIMENTS

Description will now be given of the embodiment of the present invention with reference to the accompanying drawings.

Figure 4:
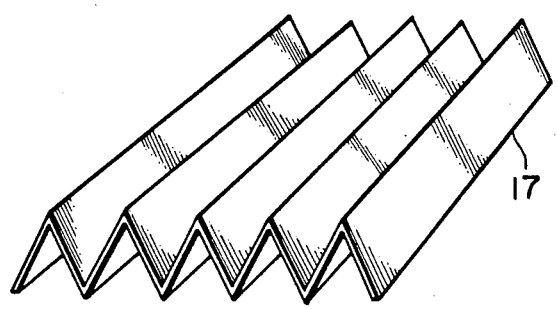
FIG. 4 is a perspective view depicting a V-shaped transparent heat trap in the embodiment shown in FIG. 3.
Figure 5A:
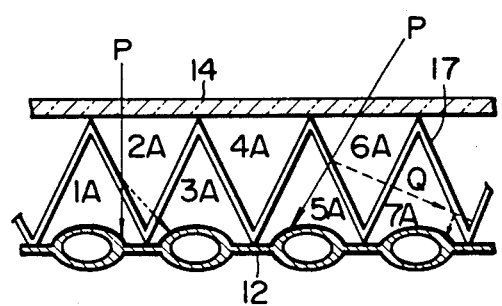
FIG. 5(A) is a sectional view showing the essential portions of FIG. 3.
Figure 5B:
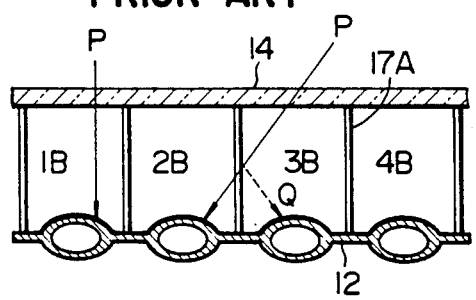
FIG. 5(B) is a sectional view showing a honeycomb transparent heat trap of the prior art.

FIG. 3 is an explanatoy view showing an embodiment of a solar heat collector 11 according to the present invention. The solar heat collector 11 comprises: an absorber plate 12 for converting the solar rays into thermal energy to transmit the thermal energy to a heat transfer medium; a heat transfer medium flow path 13; a transparent sheet 14 for preventing the convection heat loss through the absorber plate 12 and protecting the absorber plate 12 against the contamination and damages caused by the external factors; a heat insulating material 15 for preventing the heat loss through the rear surface of the solar heat collector; and an outer box 16 for totally covering the solar heat collector. The absorber plate 12 is formed in a manner to connect a plurality of tubes being flat in cross section to a flat sheet and applied to the surface thereof with a selective absorption surface treatment. This absorber plate 12 may be formed of two corrugated sheets. A transparent heat trap 17 is provided between the absorber plate 12 and the transparent sheet 14. the transparent heat trap 17 is formed of an ethylene fluoride series resin film having a film thickness of 1 to 100 μm and having a degree of crystallinity of 35 to 55%, and is transparent for the infrared rays as well as for the solar rays, and is formed into continuous V-shapes in cross section as shown in FIG. 4. This transparent heat trap 17 formed into the continuous V-shapes in cross section has a substantially regular pitch and extends across the absorber plate. The provision of the transparent heat trap 17 partitions a gap formed between the absorber plate 12 and the transparent sheet 14 into a plurality of small chambers. The ethylene fluoride series resin film as a constituent material of the transparent heat trap 17 should be transparent for the infrared rays (i.e. a low emissivity for the infrared rays) as well as for the solar rays. Such film may be preferably a copolymer FEP obtained from ethylene tetrafluoride and propylene hexafluoride, a copolymer PFA obtained from ethylene tetrafluoride and perfluoroalkyl vinyl ether, and a copolymer ETFE obtained from ethylene tetrafluoride and ethylene.

Description will hereunder be given of the heat collecting characteristics of the solar heat collector in the abovedescribed embodiment in conjunction with actions of the respective factors A through D. The factor A subjecting the surface of the absorber plate 12 to the selective absorptio surface treatment suppresses the radiation heat loss through the absorber plate 12 as has been proposed heretofore.

The factor B using a thin film having a film thickness of 1 to 100 μm as the V-shaped transparent heat trap 17 improves the transmittance so as not to attenuate the solar energy, and moreover, secures the effects of suppressing theradiation het loss like the factor A, because the factor B has a low emissivity for the infrared rays as will be described hereinafter, in other words the emissivity for the infrared rays is lowered to such an extent as to be transparent for the infrared rays. As a result, the thermal energy transferred from the absorber to the heat rrap by the convection can not be radiated as the infrared rays from the factor C because the factor C is transparent for the infrared rays.

The factor C using an ethylene fluoride series resin film as the constituent material of the V-shaped transparent heat trap 17 improves the productivity and the durability, both of which are required for the transparent heat trap. In other words, when the transparent heat trap made of glass is used, it would be impossible to secure the advantage of suppressing the radiation heat loss by the factor A even if its thickness is made thinnest possible in production. kFurthermore, when the transparent heat trap made of common transparent plastics such as polycabonate, acryl, vinyl fluoride or the like is used, it becomes impossible to secure the heat resistance required for the solar heat collector, in which the ultilmate temperature of stagnation reaches a temperature as high as 200° to 250° C.

The factor D forming the transparent heat trap 17 into continuous V-shapes in cross section can suppress the convection heat loss without decreasing the solar radiation transmittance of the heat trap, and moreover, makes it possible to decrease the contact area of the transparent heat trap with the transparent sheet or the absorber plate, thereby enabling to suppress the conduction heat loss. In comparison in action between the transparent het trap 17 according to the present invention and the conventional honeycomb transparent heat trap used for preventing the convection heat loss, the number of the chambers (1A to 7A) partitioned by the V-shaped transparent heat trap 17 being formed at a substantially regular pitch so as not to decrease the transmittance for the solar energy is larger than the number of the chambers (1B to 4B) partitioned by the conventional honeycomb transparent heat trap 17A, so that the effects for suppressing the convection can be improved by the transparent heat trap 17 according to the present inventio uner the consumption tht the values of transmittance in both cases are the same. Further, in the V-shaped transparent heat trap 17, a reflected light O of an incident ight P in the transparent heat trap is constantly directed to the absorber plate 12 in the same manner as in the honeycomb transparent heat trap, so that the former has the same phenomenal transmitting as the latter. Further, the honeycomb transparent heat trap 17A should necessarily be produece by a method of adhesive bonding, whereas the V-shaped transparent heat trap 17 made of ethylene fluoride series resin may be produced by a production method suitable for a mass production such as a vacuum forming method.

Figure 6:
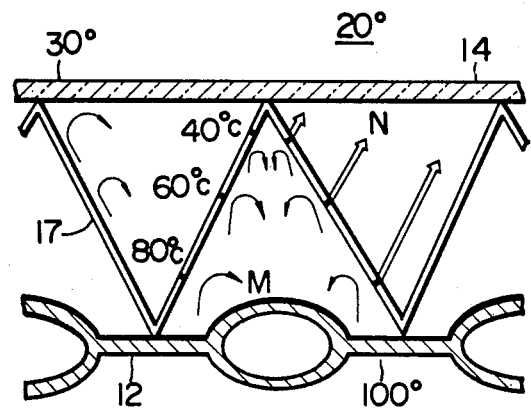
FIG. 6 is a sectional view showing the conditions of the heat transfer in FIG. 3.
Figure 7:
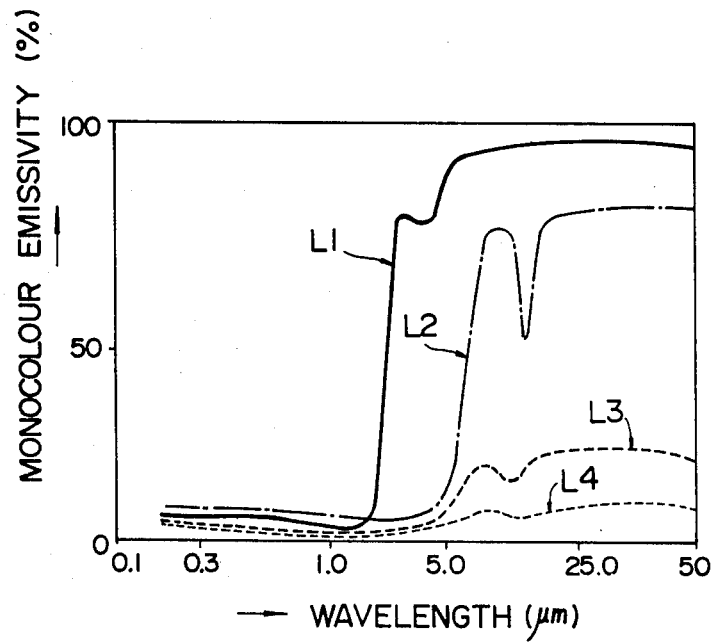
FIG. 7 is a chart showing the emissivity-wavelength characteristic curves.

Using a combination of the factor A subjecting the surface of the absorber plate 1 to the selective absorption surface treatment and the factor B setting the film thickness of the V-shaped transparent heat trap 17 to 1 to 100 μm and setting the degree of crystallinity of 35 to 55%, and factor C forming the heat trap by using ethylene fluoride series resin film, the effects of suppressing the radiation heat loss are secured by the factor A and further by the factor B and C which has a low emissivity for the infrared rays (i.e. transparent for the infrared rays). In summary, the radiation heat loss is suppressed by the factors A and B, while the convection heat loss is suppressed by the factors C and D, so that the total heat loss is lowered. More specifically, FIG. 6 shows the distribution of temperature in the V-shaped transparent heat trap 17 when an ambient temperature is 20° C., the temperature of the absorer plate 12 is 100° C. and the temperature of the transparent sheet 14 is 30° C. Under the abovedescribed condition, a heat conduction takes place from the absorber plate 12 to the transparent sheet 14, and small convections M (each of these convections M has less capacity of transferrring the heat as compared with the case where no V-shaped transparent heat trap 17 is provided) are generated in the chambers partitioned by the V-shaped transparent heat trap 17. Then, when the V-shaped transparent heat trap 17 has a high emissivity for the infrared rays (i.e. opaque for the infrared rays), a heat radiation indicated by arrows N takes place towards the transparent sheet 14 from the surface of the V-shaped transparent heat trap 17. In order to control the heat radiation N from the V-shaped transparent heat trap 17, it is necessary to use, as the V-shaped transparent heat trap, a substance having a low emissivity for the infrared rays (i.e. transparent for the infrared rays), i.e. emitting little heat radiatio. The V-shaped transparent heat trap 17 formed of an ethylene fluoride series resin film having a film thickness of 100 to 1 μm and having a degree of crystallinity of 35 to 55% according to the inventio has a low emissivity for the infrared rays aas shown in FIG. 7. More specifically, referring to FIG. 7 showing the relationships between the wavelengths and the monochromatic emissivity of: a glass $L_1$ having a thickness of 1 mm; an ethylene fluoride series resin (FEP) film $L_2$ having a film thickness of 1 mm; an ethylene fluoride series resin (FEP) film $L_3$ having a film thickness of 100 μm; and an ethylene fluoride series resin (FEP) film $L_4$ having a film thickness of 1 μm, it is observed that the ethylene fluoride series resin film $L_3$ or $L_4$ having a film thickness as thin as 100 μm or 1 μm and having a degree of crystallinity of 35 to 55% qualitatively tends to have a low emissivity for the infrared rays.

In the conventional solar heat collectors, transparent members having a high emissivity for the infrared rays are used as the transparent heat trap and to a transparent sheet are improve the thermal efficiency through the green house effects, however, such transparent heat trap are effectual only when the surfaces of the absorber plates are of nonselective absorption surfaces. Supposing that the surfaces of the absorber plates are subjected to a selective absorption surface and there is used a transparent heat trap having a high emissivity for the infrared rays, the thermal energy obtained by the convection would be radiated toward the outside as the infrared rays. This supposition leads to the conclusion that it would be better to install no transparent heat trap. The present invention, however, uses an ethylene fluoride series resin films having a low emissivity for the infrared rays, i.e. having a thickness of 100 to 1 μm and having a degree of crystallinity of 35 to 55% as described above, resulting in that the thermal energy obtained by the convection does not radiate as the infrared rays and thus the radiation heat loss is suppressed.

In consequence, the abovedescribed embodiment makes it possible to suppress the three forms of heat losses at the same time, and moreover, not to attenuate the incident solar energy. In other words, when the factors B, C and D are applied, the incident solar energy is not attenuatd, the factors A, B and C are combined to suppress the radiation heat loss satisfactorily, the factors C and D adopt the use of plastics being low in the thermal conductivity and decrease the contact area of the transparent heat trap with the transparent sheet or the absorber plate so as to suppress the conduction heat loss, and the factor D can suppress the convection heat loss to an extend lower than that in the transparent heat trap being of a honeycomb structure of the prior art. Namely, the combined effects of these factors A through D lead to that three forms of heat losses due to convection, radiation and conduction can be suppressed at the same time to obtain a high heat collecting efficiency.

As has been described hereinabove, according to the present invention, in the solar heat collector, wherein an absorber plate is mounted in a box member provided on the surface thereof with a transparent sheet, the surface of the absorber plate is subjected to the selective absorption surface treatment, and the V-shaped transparent heat trap formed of the ethylene fluoride series resin film having a film thickness of 1 to 100 μm is provided between the transparent sheet and the absorber plate, whereby the three forms of heat losses due to convection, radiation and conduction are suppressed at the same time, so that a high heat collecting efficiency can be achieved.

While the described embodiment represents the preferred form of the present invention, it is to be understood that modifications will occure to those skilled in the art without departing from the spitit of the invention. The scope of the invention is therefore to be determined solely by the appended claims.

What is claimed is:

1. A solar heat collector comprising:
an outer box opened at an upper portion thereof for receiving solar rays;
a heat insulating material disposed in a bottom of said outer box over an entire length and width of the bottom for preventing heat loss from said bottom to an outside;
an absorber plate provided insaid outer box for converting the solar rays into thermal energy to transmit the thermal energy to a heat transfer medium, said absorber plate being formed in a manner to connect a plurality of tubes being flat in cross section to plate means, and said absorber plate being applied to a surface thereof with a selective absorption surface treatment;

a transparent sheet secured to the opened upper portion of said outer box for preventing a convection heat loss through said absorber plate and protecting said absorber plate against contaminatio and damages caused by external factors; and a transparent heat trap being transparent for infrared rays as well as the solar rays and formed of an ethylene fluoride series resin film having a film thickness of 1 to 100 μm and having a degree of crystallinity of 35 to 55%, said transparent heat trap being formed into continuous V-shapes in cross section at a substantially regular pitch and disposed between said transparent sheet and said absorber plate and extending across the absorber plate, whereby three forms of heat losses due to convection, radiation and conduction are suppressed simultaneously, thereby enabling to secure a high heat collecting efficiency.

2. A solar heat collector as set forth in claim 1, wherein said transparent heat trap is made of a copolymer FEP obtained from ethylene tetrafluoride and propylene hexafluoride.

3. A solar heat collector as set forth in claim 1, wherein said transparent heat trap is made of a copolymer PFA obtained from ethylene tetrafluoride and perfluoroalkyl vinyl ether.

4. A solar heat collector as set forth in claim 1, wherein said transparent heat trap is made of a copolymer ETFE obtained from ethylene tetrafluoride and ethylene.

* * * * *